United States Patent
Oh et al.

(10) Patent No.: US 11,328,453 B2
(45) Date of Patent: May 10, 2022

(54) DEVICE AND METHOD FOR IMAGE PROCESSING

(71) Applicant: Samsung Electronics Co., Ltd., Suwon-si (KR)

(72) Inventors: Youngho Oh, Suwon-si (KR); Sungryeul Rhyu, Suwon-si (KR); Jihwan Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 16/981,021

(22) PCT Filed: Apr. 11, 2019

(86) PCT No.: PCT/KR2019/004377
§ 371 (c)(1),
(2) Date: Sep. 15, 2020

(87) PCT Pub. No.: WO2019/199087
PCT Pub. Date: Oct. 17, 2019

(65) Prior Publication Data
US 2021/0074030 A1  Mar. 11, 2021

(30) Foreign Application Priority Data

Apr. 11, 2018 (KR) .................. 10-2018-0042423

(51) Int. Cl.
| | | |
|---|---|---|
| *G06T 9/00* | (2006.01) | |
| *G06T 7/00* | (2017.01) | |
| *G06T 5/50* | (2006.01) | |

(52) U.S. Cl.
CPC ............... *G06T 9/005* (2013.01); *G06T 5/50* (2013.01); *G06T 7/97* (2017.01)

(58) Field of Classification Search
CPC ..................... H04N 19/00–99; G06T 9/00–40
See application file for complete search history.

(56) References Cited

U.S. PATENT DOCUMENTS 9,584,794 B2   2/2017   Bruls et al.
9,918,064 B2   3/2018   Yin et al.
(Continued)

FOREIGN PATENT DOCUMENTS

| EP | 3 232 661 A1 | 10/2017 |
|---|---|---|
| JP | 2016-015766 A | 1/2016 |

(Continued)

OTHER PUBLICATIONS

Cheng et al., A Multi-View Video Coding Approach Using Layered Depth Image, XP 031224797, Oct. 1, 2007, Beijing, China.
(Continued)

*Primary Examiner* — Sean T Motsinger
(74) *Attorney, Agent, or Firm* — Jefferson IP Law, LLP

(57) ABSTRACT

Proposed in various embodiments of the present disclosure are a device and a method for image processing, whereby image conversion by dilation is carried out in a multimedia system. To this end, an electronic device for image processing may identify between a first unused area in a first picture and a second unused area in a second picture, the first unused area and the second unused area having the same time information. The electronic device may acquire fill values for replacing the first unused area and the second unused area, on the basis of a value acquired from the first unused area and a value acquired from the second unused area. The electronic device may acquire a first converted picture and a second converted picture by replacing the first unused area and the second unused area by using the acquired fill values.

20 Claims, 7 Drawing Sheets

(56) References Cited

U.S. PATENT DOCUMENTS

| | | |
|---|---|---|
| 2006/0268987 A1 | 11/2006 | Ha |
| 2016/0140700 A1 | 5/2016 | Park et al. |
| 2017/0048550 A1 | 2/2017 | Hannuksela |
| 2017/0230668 A1* | 8/2017 | Lin .................. H04N 19/563 |
| 2017/0307894 A1* | 10/2017 | Aoki ................ G02B 27/0068 |
| 2018/0063482 A1 | 3/2018 | Goesnar |
| 2018/0098090 A1* | 4/2018 | Lin .................. H04N 19/174 |
| 2019/0222862 A1* | 7/2019 | Shin ................... G06T 3/005 |

FOREIGN PATENT DOCUMENTS

| | | |
|---|---|---|
| KR | 10-0636785 B1 | 10/2006 |
| KR | 10-1350597 B1 | 1/2014 |
| KR | 10-1669524 B1 | 11/2016 |
| KR | 10-2017-0065578 A | 6/2017 |

OTHER PUBLICATIONS

Samsung Electronics, Texture Padding Improvement, International Organisation for Standardisation Organisation Internationale De Normalisation, ISO/IEC JTC1/SC29AVG11, Coding of Moving Pictures and Audio, XP 030261816, Apr. 15, 2018, San Diego, CA, USA.

8i Labs, Inc., Point Cloud Compression Using a Blockable Geometry Representation and Video-Based Color Compression. International Organisation for Standardisation Drganisation Internationale De Normalisation, ISO/IEC JTC1/SC29AVG11, Coding of Moving Pictures and Audio, XP 030070082, Oct. 19, 2017, Macau.

Extended European Search Report dated Jan. 14, 2021, issued in European Patent Application No. 19786196.6.

* cited by examiner

DEVICE AND METHOD FOR IMAGE PROCESSING

CROSS-REFERENCE TO RELATED APPLICATION(S)

This application is a National Phase Entry of PCT International Application No. PCT/KR2019/004377, which was filed on Apr. 11, 2019 and claims priority to Korean patent application number 10-2018-0042423, which was filed on Apr. 11, 2018 in the Korean Intellectual Property Office, the contents of which are incorporated herein by reference.

BACKGROUND

1. Field

Various embodiments of the present disclosure relate to an image processing device and method for performing image conversion by dilation in a multimedia system.

2. Description of the Related Art

A multimedia service is able to support various types of content supporting high quality based on development of image processing and communication technologies. The multimedia service enables, for example, a user to watch one content at various viewpoints or watch one content in a three-dimensional effect.

In other words, a three-dimensional (3D) technology makes it possible to support a multimedia service utilizing 'three-dimensional feeling' that a human visually feels. An image to which the 3D technology is applied allows an experience similar to what a human actually sees compared to a two-dimensional (2D) image which is a flat image.

In addition, an omnidirectional (360-degree) image processing technology enables a viewer to view an image in all directions (front, back, left, right, top, bottom, etc.) at one time point, and a multi-viewpoint image processing technology enables a viewer to view an image of one content at various viewpoints.

The image processing technology as described above may be used for face recognition, 3D avatar, virtual makeup, virtual fitting, 3D photo shooting, gesture recognition, 3D content generation for virtual reality (VR), support for accurate and realistic augmented reality (AR), understanding of a scene, 3D scanning, and/or the like.

SUMMARY

As described above, in order to support high quality or various types of multimedia services, data of content for storage or transmission will inevitably increase. In this case, there is a need to prepare a scheme for efficiently converting, compressing, storing, and transmitting data of content to an image for storage or transmission.

According to an embodiment of the present disclosure, it is possible to provide a device and method for performing image conversion by an extension targeting a plurality of pictures in a multimedia system.

According to an embodiment of the present disclosure, it is possible to provide a device and method for performing image conversion by using an extension to fill an unused area in each of some or all of a plurality of pictures constituting one frame in a multimedia system.

According to an embodiment of the present disclosure, it is possible to provide a device and method for grouping a plurality of pictures constituting one frame into one or more groups, and performing image conversion for each picture included in a corresponding group by using an extension for each group in a multimedia system.

A method for processing an image according to various embodiments of the present disclosure may include identifying a first unused area in a first picture and a second unused area in a second picture, the first picture and the second picture having the same time information; obtaining a fill value for replacing the first unused area and the second unused area based on a value obtained from the first unused area which is identified from the first picture and a value obtained from the second unused area which is identified from the second picture; and replacing the first unused area and the second unused area by using the obtained fill value.

A device for processing an image according to various embodiments of the present disclosure includes at least one memory; and at least one processor connected to the at least one memory, and the at least one processor is configured to: identify a first unused area in a first picture and a second unused area in a second picture, the first picture and the second picture having the same time information; obtain a fill value for replacing the first unused area and the second unused area based on a value obtained from the first unused area and a value obtained from the second unused area; and replace the first unused area and the second unused area by using the obtained fill value.

DETAILED DESCRIPTION

Figure 1:
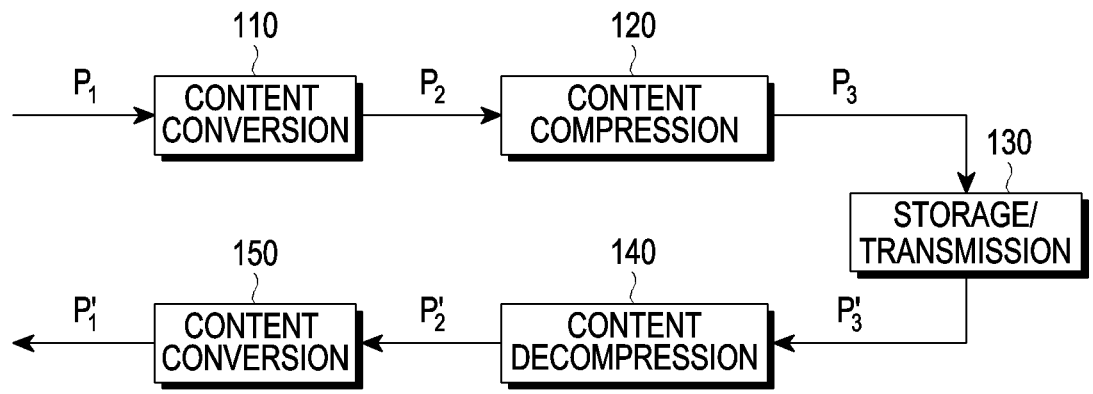
FIG. 1 is a diagram schematically illustrating an image processing procedure according to various embodiments proposed in the present disclosure.

Hereinafter, embodiments of the present disclosure are described with reference to accompanying drawings. However, it should be appreciated that the present disclosure is not limited to the embodiments, and various changes and/or equivalents or replacements thereto also belong to the scope of the present disclosure. The same or similar reference denotations may be used to refer to the same or similar components throughout the specification and the drawings.

As used herein, the terms "have," "may have," "include," or "may include" a feature (e.g., a number, a function, an operation, or a component such as a part, and/or the like) indicate existence of the feature and do not exclude the existence of other features.

As used herein, the terms "A or B," "at least one of A and/or B," or "one or more of A and/or B" may include all possible combinations of items listed together. For example, "A or B," "at least one of A and B," "at least one of A or B" may indicate all of (1) including at least one A, (2) including at least one B, or (3) including at least one A and at least one B.

As used in various embodiments, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be referred to as a second component, and vice versa without departing from the scope of the present disclosure.

It will be understood that when a component (e.g., a first component) is referred to as being (operatively or communicatively) "coupled with/to," or "connected with/to" another component (e.g., a second component), it may be coupled or connected with/to the other component directly or via a third component. In contrast, it will be understood that when a component (e.g., a first component) is referred to as being "directly coupled with/to" or "directly connected with/to" another component (e.g., a second component), no other component (e.g., a third component) intervenes between the component and the other component.

As used herein, the terms "configured (or set) to" may be interchangeably used with the terms "suitable for," "having the capacity to," "designed to," "adapted to," "made to," or "capable of" depending on a circumstance. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe specific embodiments thereof, but not to limit the scope of other embodiments of the present disclosure. It is to be understood that the singular forms include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Hereinafter, various embodiments proposed in the present disclosure will be described in detail with reference to the accompanying drawings.

FIG. 1 is a diagram schematically illustrating an image processing procedure according to various embodiments proposed in the present disclosure.

Referring to FIG. 1, in content conversion operation 110, frames for target content (hereinafter, referred to as 'input frames') are input, the input frames are converted to have a data structure of a desired form, and the converted frames (hereinafter, referred to as 'converted frames') are outputted. The input frames may be frames of an image captured or stored for the target content. The captured image may be, for example, an image which is captured in real time by using various types of cameras. The stored image may be, for example, an image which is previously stored in an internal memory, or an external server, and/or the like for a purpose of consuming the target content.

The input frame and the converted frame may be composed of a plurality of pictures. In this case, conversion into a data structure of a desired form may be performed by at least one of conversion per picture and conversion between pictures. If both of the conversions are performed, second conversion between pictures may be sequentially performed after first conversion per picture.

The first conversion may be performed by deriving some or all values of a used area in each pixel and filling a unused area in a corresponding pixel with the derived value. That is, a value derived from a used area in a target pixel may be used as a value for filling a unused area in the target pixel. Here, the use area may be an area filled with actual data for a multimedia service in the entire area in the corresponding pixel. The unused area may be an area in which the actual data for the multimedia service does not exist in the entire area in the corresponding pixel.

The first conversion may be performed by filling the unused area in the corresponding pixel with a predetermined value (zero (0) or an arbitrary value). That is, a preset value may be used as a value for filling the unused area in the target pixel.

The second conversion may be performed by obtaining a value for filling a unused area in a corresponding pixel by considering a value derived from the corresponding pixel or a value derived from one or more other pixels, and filling the corresponding pixel or the one or more other pixels with the obtained value.

According to an embodiment proposed for the second conversion, in content conversion operation 110, pictures $P_1$ constituting an input frame may be inputted, and the inputted pictures $P_1$ may be grouped into a plurality of groups. In content conversion operation 110, a value of an unused area in each of a plurality of pictures grouped into each group may be replaced with a fill value, and pictures $P_2$ that the value of the unused area is replaced with the fill value may be outputted.

The fill value may be obtained by using a value of a used area in each of a plurality of pictures grouped into one group. If a first picture and a second picture are grouped into one group, one of a value obtained from the first picture and a value obtained from the second picture may be obtained as the fill value. That is, a minimum value or a maximum value of the value obtained from the first picture and the value obtained from the second picture may be obtained as the fill value. In addition, if the first picture and the second picture are grouped into one group, an average value of the value obtained from the first picture and the value obtained from the second picture may be obtained as the fill value. In addition, a duplicate value of the value obtained from the first picture and the value obtained from the second picture may be obtained as the fill value, or an intermediate value between the value obtained from the first picture and the value obtained from the second picture may be obtained as the fill value.

In the above example, two pictures are assumed, however, the same may be applied to more pictures.

In the present disclosure, in content conversion operation 110, implementation by various combinations of the first and second conversions is considered. That is, only the first conversion or the second conversion may be performed, or the second conversion may be performed after the first conversion is performed. In addition, one of combinations of the first and second conversions may be selectively used in consideration of at least one of requirements (quality, a content type, a transmission rate, a compression scheme, and/or the like) for a multimedia service. For example, only the first conversion or the second conversion may be applied to a multimedia service of low quality, and both the first conversion and the second conversion may be applied to a multimedia service of relatively high quality.

Grouping in content conversion operation 110 may be performed by using a temporal or spatial criterion. That is, pictures having the same time information among the inputted pictures $P_1$ may be grouped into one group. In this case, pictures grouped into one group may be images captured at different viewpoints at the same time point. For example, the pictures grouped into one group images captured by cameras which are installed at different viewpoints at the same time point.

Filling the unused area in each picture with the obtained value in content conversion operation 110 may mitigate performance degradation such as signal-to-noise ratio (SNR) that occurs during compression or increase compression efficiency.

In content conversion operation 110, whether unused areas in the pictures are the same may be identified before filling the unused areas in the pictures in the same group with the obtained value. Filling the unused area in each of the pictures with the obtained value in content conversion operation 110 may be applied only if the unused areas in the pictures are the same. In this case, the unused areas which will be filled with the obtained value may be the same for the corresponding pictures.

In content compression operation 120, the converted pictures $P_2$ that an unused area is replaced with the fill value may be compressed by using one encoding scheme, and output compressed pictures $P_3$ according to the compression. For example, a high efficiency video codec (HEVC) scheme, an entropy scheme, and/or the like may be used as the encoding scheme.

The pictures $P_3$ outputted in content compression operation 120 have a relatively small size compared to the pictures $P_2$ inputted from content conversion operation 110. In content compression operation 120, an encoding scheme may be adaptively applied in consideration of types of the pictures $P_2$ inputted from content conversion operation 110. That is, the encoding scheme in content compression operation 120 may be determined as one of the HEVC scheme and the entropy scheme in consideration of the types of the inputted pictures $P_2$ and the determined one may be used.

In storage and/or transmission operation 130, the compressed pictures $P_3$ outputted from content compression operation 120 may be stored in a designated area of an internal memory, or may be provided to a designated external server to be stored in the designated external server. In storing and/or transmitting operation 130, the compressed pictures $P_3$ outputted from content compression operation 120 may be transmitted to a content consuming device based on a predetermined protocol for a broadcast service. The predetermined protocol may be, for example, a transmission scheme prescribed in multimedia transmission technology (MMT), next-generation terrestrial broadcasting technology (ATSC 3.0), and/or the like. That is, in storage and/or transmission operation 130, the compressed pictures $P_3$ may be configured into a prescribed transmission packet based on a protocol to be used, and the transmission packet may be transmitted to the content consuming device.

In storing and/or transmitting operation 130, the compressed pictures $P_3$ stored in the internal memory may be processed based on the predetermined protocol for the broadcast service, the processed pictures may configured into a transmission packet in a format prescribed for the predetermined protocol, and the transmission packet may be transmitted to the content consuming device.

Although not shown, in order to reduce sizes of the stored and/or transmitted pictures $P_3$, the value filled in the unused area in each picture in content conversion operation 110 may be removed from the pictures $P_3$ compressed in content compression operation 120, and the same may be outputted. If the value filled in the unused area in each picture in content conversion operation 110 is removed from the compressed pictures $P_3$, there is no need to perform an operation of removing the value filled in the unused area in each picture in a content conversion operation 150 to be described later.

In content decompression operation 140, compressed pictures $P'_3$ provided by storing and/or transmitting operation 130 may be decompressed, and the decompressed pictures $P'_2$ may be outputted. For the decompression, an encoding scheme used in content compression operation 120 may be considered. That is, a decoding scheme to be used in content decompression step operation may be determined according to the encoding scheme used in content compression operation 120.

In content conversion operation 150, the decompressed pictures $P'_2$ decompressed in content decompression operation 140 may be inputted, the value filled in the unused area in content conversion operation 110 may be removed in each of the decompressed pictures $P'_2$, and pictures $P'_1$ that the value filled in the unused area is removed may be outputted. Information about an unused area and/or a used area in each of the decompressed pictures $P'_2$ may be provided via separate control information (meta data, etc.). The control information may be equally applied to one frame. That is, one control information may be provided for all pictures constituting one frame.

Figure 2:
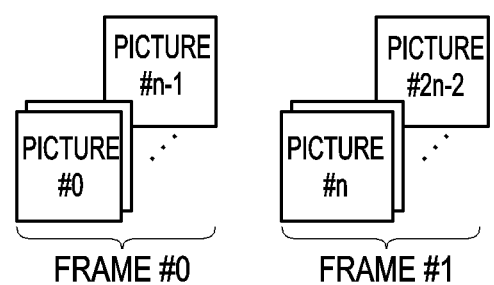
FIG. 2 is a diagram illustrating a structure of a frame inputted for image processing according to various embodiments proposed in the present disclosure.

FIG. 2 is a diagram illustrating a structure of a frame inputted for image processing according to various embodiments proposed in the present disclosure.

Referring to FIG. 2, each of frames (frame #0 and frame #1) may include n pictures. For example, a first frame (the frame #0) may include a picture #0, . . . , a picture #n−1, and a second frame (the frame #1) may include a picture #n, . . . , a picture #2n−2. The frame #0 and the frame #1 may be a set of pictures whose time points or viewpoints are different or may be a set of pictures during a predetermined time period.

The pictures included in the frame may be grouped into a plurality of groups in consideration of a predetermined criterion. For example, if the same time information is the criterion, pictures having the same time information among the pictures may be grouped into one group. Here, a fact that the pictures have the same time information may mean a fact that the pictures are captured at different viewpoints at the same time. As another example, if an input order is the criterion, the pictures may be sequentially grouped into a plurality of groups according to the input order. As another example, if a picture index is the criterion, the pictures may be sequentially grouped into a plurality of groups according to the picture index.

Figure 3:
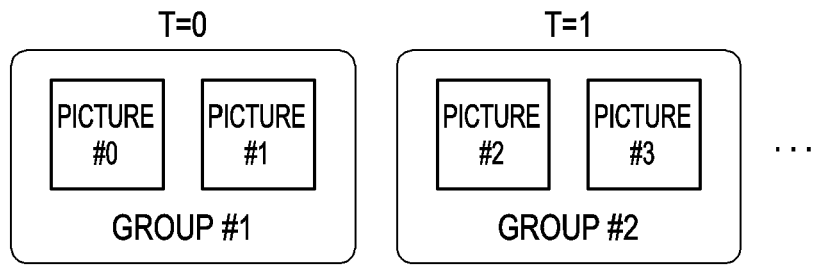
FIG. 3 is a diagram illustrating an example of image conversion by grouping according to various embodiments proposed in the present disclosure.

FIG. 3 is a diagram illustrating an example of image conversion by grouping according to various embodiments proposed in the present disclosure.

Referring to FIG. 3, it is assumed that two pictures having the same time information exist in pictures included in one frame. The two pictures having the same time information may be an image in which patches extracted from an image captured at the same time point at different viewpoints are disposed.

For example, a first picture may be configured by disposing patches captured in each of front, rear, left, right, up, and down directions at a first viewpoint at a specific time point on one screen. In addition, a second picture may be configured by disposing patches captured in each of the front, rear, left, right, up, and down directions at a second viewpoint at the specific time point on one screen.

Group #1 may be configured by grouping picture #1 and picture #2 having time information 'T=0', and group #2 may be configured by grouping picture #2 and picture #3 having specific time information 'T=1'.

In this case, a fill value may be obtained based on information included in each of the picture #1 and the picture #2, and the obtained fill value may be applied to an unused area in each of the picture #1 and the picture #2.

If the unused area in the picture #1 and the unused area in the picture #2 do not completely match, the obtained fill value may be applied to an area where the unused area in the picture #1 and the unused area in the picture #2 overlap.

Figure 4A:
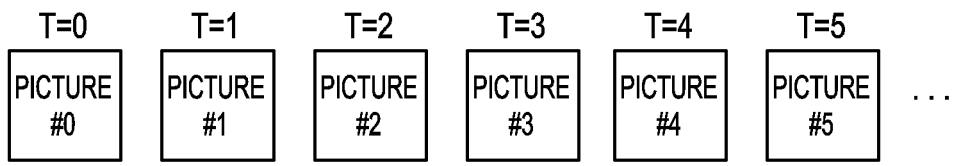
FIG. 4 is a diagram illustrating another example of image conversion by grouping according to various embodiments proposed in the present disclosure.
Figure 4B:
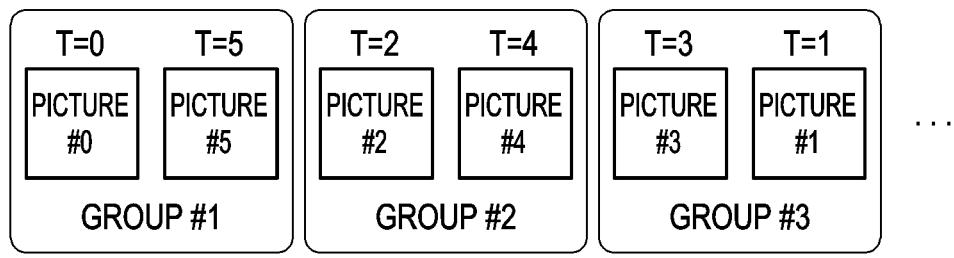

FIG. 4 is a diagram illustrating another example of image conversion by grouping according to various embodiments proposed in the present disclosure.

Referring to FIG. 4, it is assumed that, in an order of time information (T=0, 1, 2, 3, 4, and 5), pictures #0, #1, #2, #3, #4, and #5 are inputted for content conversion, and pictures #0, #5, #2, #4, #3, and #1 are inputted for content compression.

In this case, group #1 may be configured by grouping the picture #1 and the picture #2 having time information 'T=0', and group #2 may be configured by grouping the picture #2 and the picture #3 having specific time information 'T=1'.

As shown, in consideration of an input order for content compression, the picture #0 and the picture #5 may be grouped into the group #1, the picture #2 and the picture #4 may be grouped into the group #2, and the picture #3 and the picture #1 may be grouped into the group #3.

In this case, for the group #1, a fill value may be obtained based on information included in each of the picture #0 and the picture #5, and the obtained fill value may be applied to a unused area in each of the picture #0 and the picture #5. For the group #2, a fill value may be obtained based on information included in each of the picture #2 and the picture #4, and the obtained fill value may be applied to a unused area in each of the picture #2 and the picture #4. For the group #3, a fill value may be obtained based on information included in each of the picture #3 and the picture #1, and the obtained fill value may be applied to a unused area in each of the picture #3 and the picture #1.

Figure 5A:
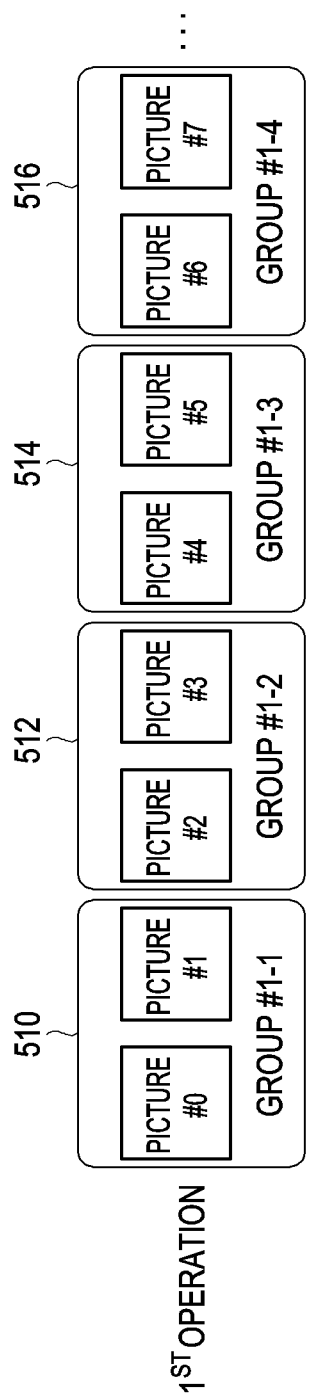
FIG. 5 is a diagram illustrating still another example of image conversion by grouping according to various embodiments proposed in the present disclosure.
Figure 5B:
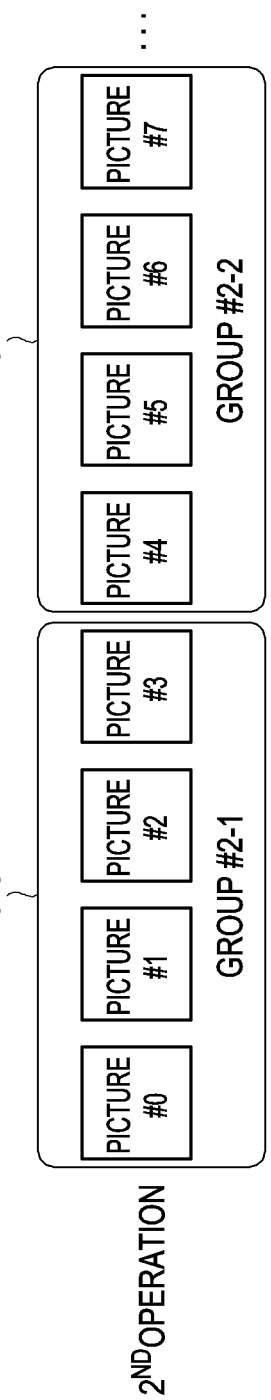
Figure 5C:
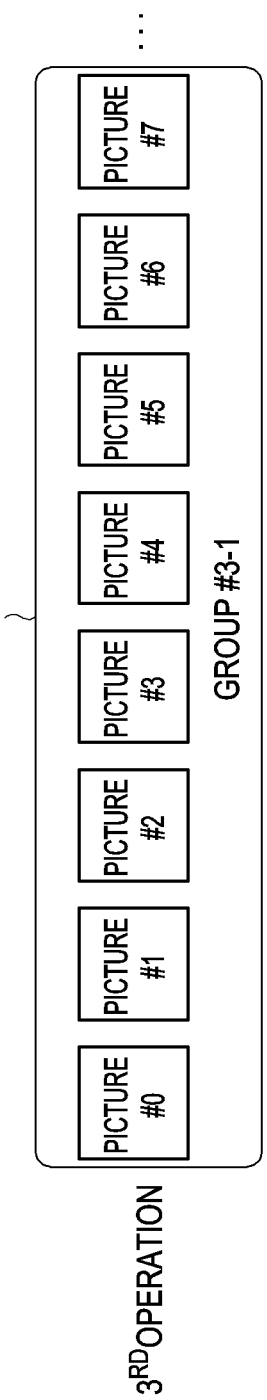

FIG. 5 is a diagram illustrating still another example of image conversion by grouping according to various embodiments proposed in the present disclosure.

Referring to FIG. 5, a content conversion operation for replacing an unused area in a pixel with a fill value may be performed hierarchically. The content conversion operation may be performed, for example, in three operations.

In a first operation (a $1^{st}$ operation), a fill value may be applied to a unused area in each picture for each of groups 510, 512, 514, and 516 according to grouping. For example, a fill value may be obtained based on information included in each of picture #0 and picture #1 included in group #1-1 510, and the obtained fill value may be replaced with a unused area in each of the picture #0 and picture #1. A fill value may be obtained based on information included in each of picture #2 and picture #3 included in group #1-2 512, and the obtained fill value may be replaced with a unused area in each of the picture #2 and picture #3. A fill value may be obtained based on information included in each of picture #4 and picture #5 included in group #1-3 514, and the obtained fill value may be replaced with a unused area in each of the picture #4 and picture #5. A fill value may be obtained based on information included in each of picture #6 and picture #7 included in group #1-4 516, and the obtained fill value may be replaced with a unused area in each of the picture #6 and picture #7.

In a second operation (a $2^{nd}$ operation) performed after the first operation (the $1^{st}$ operation), the two groups in the first operation (the $1^{st}$ operation) may be grouped into one group, and a fill value may be applied to a unused area in each picture for each of the groups 520 and 522 according to the grouping. For example, a fill value may be obtained based on information included in each of picture #0, picture #1, picture #2, and picture #3 included in group #2-1 520, and the obtained fill value may be replaced with a unused area in each of the picture #0, the picture #1, the picture #2, and the picture #3. A fill value may be obtained based on information included in each of picture #4, picture #5, picture #6, and picture #7 included in group #2-2 522, and the obtained fill value may be replaced with a unused area in each of the picture #4, the picture #5, the picture #6, and the picture #7.

In a third operation (a $3^{rd}$ operation) performed after the second operation (the 2nd operation), the two groups 520 and 522 in the second operation (the 2nd operation) may be grouped into one group 530, and a fill value may be applied to a unused area in each picture for the group 530 according to the grouping. For example, a fill value may be obtained based on information included in each of picture #0, picture #1, picture #2, picture #3, picture #4, picture #5, picture #6, and picture #7 included in group #3-1 530, and the obtained fill value may be replaced with a unused area in each of the picture #0, the picture #1, the picture #2, the picture #3, the picture #4, the picture #5, the picture #6, and the picture #7.

As described above, if the content conversion operation is performed hierarchically, the number of pictures which will replace the fill value may increase as operations increase.

Figure 6:
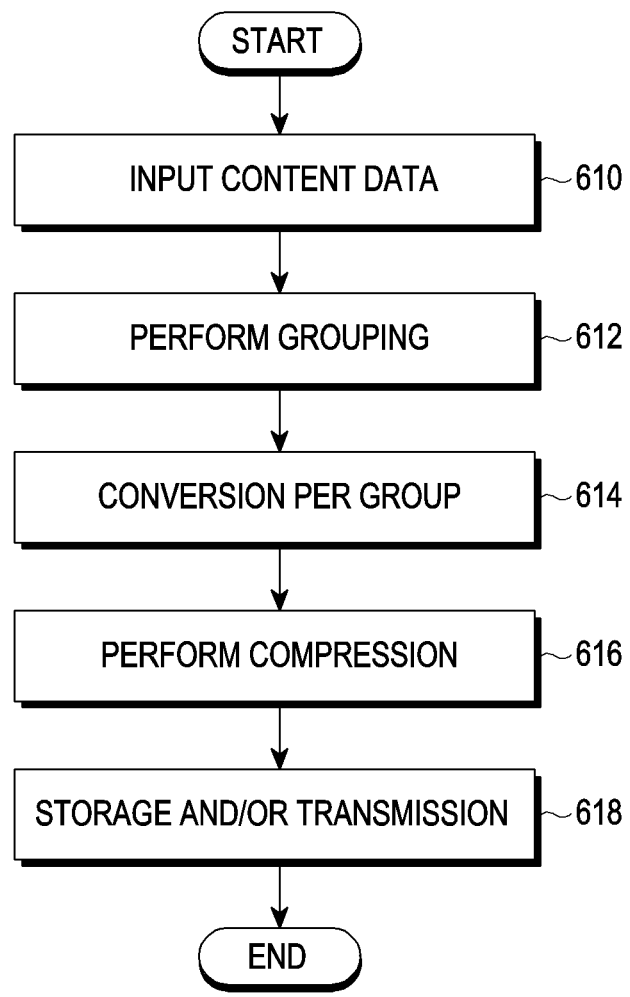
FIG. 6 is a diagram illustrating an image processing procedure for generating content in an electronic device according to various embodiments proposed in the present disclosure.

FIG. 6 is a diagram illustrating an image processing procedure for generating content in an electronic device according to various embodiments proposed in the present disclosure.

Referring to FIG. 6, in operation 610, the electronic device may receive data for content conversion in frame units. In one frame for the content conversion, pictures thereof may be inputted in an order as shown in (a) in FIG. 4.

In operation 612, the electronic device may group pictures included in one frame into a plurality of groups for content conversion. For example, the electronic device may group two pictures into one group based on the same time information for pictures constituting an input frame.

In operation 614, the electronic device perform content conversion per group. For example, the electronic device may replace a value of an unused area in each of a plurality of pictures grouped into each group with a fill value, and output pictures that the unused areas are replaced with the fill value. The fill value may be obtained by using a value of all or some of areas in each of a plurality of pictures grouped into one group. An area for obtaining the fill value may be selected from a used area in a target picture.

According to an embodiment, if a first picture and a second picture are grouped into one group, one of a minimum value, a maximum value, an average value, an intermediate value, or a duplicate value of a value obtained from the first picture and a value obtained from the second picture may be obtained as a fill value.

In operation 616, the electronic device may perform compression for the content-converted pictures by using a predetermined encoding scheme. For example, an HEVC scheme, an entropy scheme, and/or the like may be used as the encoding scheme.

In operation 618, the electronic device may store and/or transmit the compressed pictures. Upon transmitting the compressed pictures, the electronic device may be implemented based on a predetermined protocol for a broadcast service. The predetermined protocol may be, for example, a transmission scheme prescribed in MMT, ATSC 3.0, and/or the like. That is, the electronic device may configure the compressed pictures into a prescribed transmission packet in consideration of a protocol to be used, and transmit the transmission packet to a content consuming device.

The electronic device may process the compressed pictures stored in an internal memory based on the predetermined protocol for the broadcast service, configure the processed pictures into a transmission packet in a format prescribed for the predetermined protocol, and transmit the transmission packet to the content consuming device.

Although not shown, for reducing sizes of stored and/or transmitted pictures, upon content conversion, a value filled in an unused area in each of pictures which are compressed in a content compression operation may be removed and then each picture that the value filled in the unused area is removed may be outputted. If the value filled in the unused area in each of the compressed pictures is removed upon content conversion, the content consuming device does not need to remove the value filled in the unused area in each picture when content is consumed.

Figure 7:
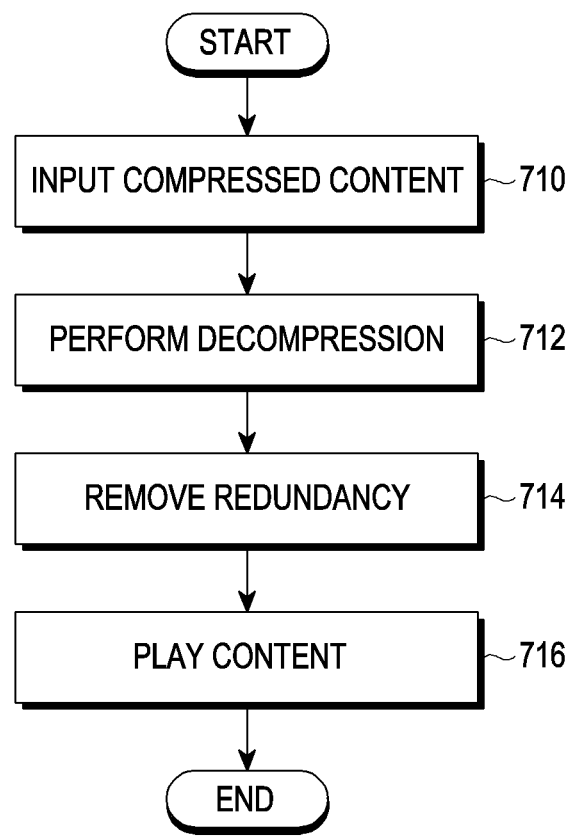
FIG. 7 is a diagram illustrating an image processing procedure for consuming content in an electronic device according to various embodiments proposed in the present disclosure.

FIG. 7 is a diagram illustrating an image processing procedure for consuming content in an electronic device according to various embodiments proposed in the present disclosure.

Referring to FIG. 7, in operation 710, the electronic device inputs content data which is provided from a content providing device or stored in an internal memory, and which includes compressed pictures.

In operation 712, the electronic device may perform decompression on the compressed pictures and output the decompressed pictures. For the decompression, an encoding scheme used for compression may be considered. That is, a decoding scheme for the decompression may be determined according to the encoding scheme used for the compression.

In operation 714, the electronic device may input the decompressed pictures, remove a redundancy filled in an unused area in each of the decompressed pictures, and output pictures that the redundancies are removed.

The electronic device may receive, from the content providing device, information about an unused area and/or a used area in each of the decompressed pictures via separate control information (meta data, etc.). The control information may be equally applied to one frame. That is, one control information may be provided for all pictures constituting one frame. If the content providing device removes a redundancy before transmitting content data, the electronic device may omit operation 714 of removing the redundancy.

The electronic device may play content which a user wants by using the decompressed pictures in operation 716.

Figure 8:
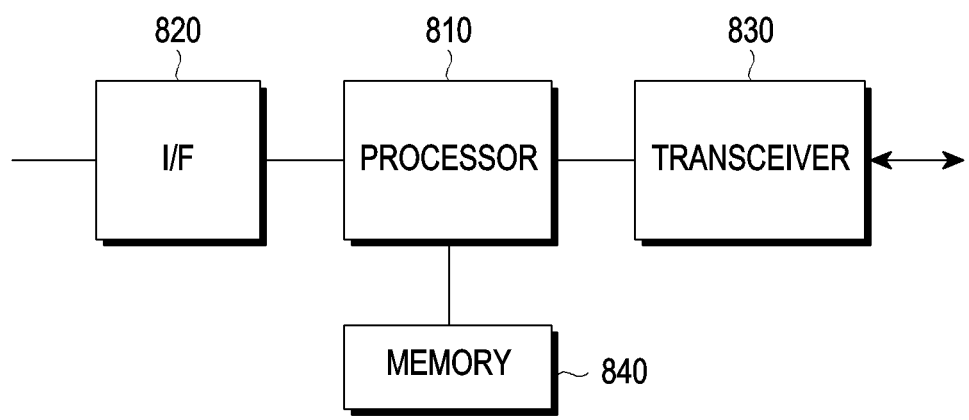
FIG. 8 is a diagram illustrating a structure for image processing in an electronic device according to various embodiments proposed in the present disclosure.

FIG. 8 is a diagram illustrating a structure for image processing in an electronic device according to various embodiments proposed in the present disclosure.

Referring to FIG. 8, the electronic device may include at least one processor 810, an interface (I/F) 820, a transceiver 830, and a memory 840 for image processing. In the following, for convenience of description, the term processor is used, but it will be clear that an operation performed by the processor may be distributed and processed by a plurality of processors.

The I/F 820 may be connected to one or more input devices such as a keypad, at least one camera, a touch panel, an external memory, and/or the like, or to one or more output devices such as a printer, a monitor, an external memory, and/or the like.

The I/F 820 may provide the processor 810 with data inputted from the one or more input devices, and output data provided by the processor 810 to the one or more output devices. In particular, the I/F 820 may receive an image captured by one or more cameras and transfer the image to the processor 810. A format in which the I/F 820 transfers the image to the processor 810, and/or the like may be promised in advance.

The I/F 820 may output content data provided by the processor 810 to a monitor for playback.

The processor 810 may control an image processing procedure for content generation and an operation according to the image processing procedure for content consumption. The image processing procedure for content generation may include a content conversion operation, a content compression operation, and a content storage/transmission operation. The image processing procedure for content consumption may include a content input operation, a content decompression operation, and a content conversion operation.

According to an embodiment, the processor 810 may perform the operation according to the image processing procedure for content generation as follows.

The processor 810 may receive, from the I/F 820, data for content conversion in frame units. In one frame for the content conversion, pictures thereof may be inputted in an order as shown in (a) in FIG. 4.

The processor 810 may group pictures included in the frame into a plurality of groups for the content conversion, and perform the content conversion for each group. The processor 810 may group, for example, a first picture and a second picture which have the same time information among a plurality of pictures included in the frame into one group for image conversion.

The processor 810 may replace a value of an unused area in each of a plurality of pictures grouped into each group with a fill value. The fill value may be obtained by using a value of all or some of areas in each of a plurality of pictures grouped into one group. An area for obtaining the fill value may be selected from a used area in a target picture.

According to an embodiment, if the first picture and the second picture which have the same time information are grouped into one group, the processor 810 may identify a first unused area in the first picture and a second unused area in the second picture. The processor 810 may obtain a fill value based on a value obtained from the first unused area and a value obtained from the second unused area. The processor 810 may replace the first unused area and the second unused area by using the obtained fill value.

The processor 810 may obtain one of the value obtained from the first unused area and the value obtained from the second unused area as the fill value, or obtain an average value of the value obtained from the first unused area and the value obtained from the second unused area as the fill value. The processor 810 may obtain a minimum value of the value obtained from the first unused area and the value obtained from the second unused area as the fill value, or obtain a maximum value of the value obtained from the first unused area and the value obtained from the second unused area as the fill value.

The processor 810 may perform compression for the content-converted pictures by using a predetermined encoding scheme. For example, an HEVC scheme, an entropy scheme, and/or the like may be used as the encoding scheme.

The processor 810 may perform control for storing and/or transmitting the compressed pictures. Upon transmitting the compressed pictures, the processor 810 may be implemented based on a predetermined protocol for a broadcast service. The predetermined protocol may be, for example, a transmission scheme prescribed in MMT, ATSC 3.0, and/or the like. That is, the processor 810 may control the transceiver 830 to configure the compressed pictures into a prescribed transmission packet in consideration of a protocol to be used, and transmit the transmission packet to a content consuming device.

The processor 810 may control the transceiver 830 to process the compressed pictures stored in the memory 840 based on the predetermined protocol for the broadcast service, configure the processed pictures into a transmission packet in a format prescribed for the predetermined protocol, and transmit the transmission packet to the content consuming device.

Although not shown, the processor 810 may remove a value filled in an unused area in each picture after compression and output each picture that the value filled in the unused area is removed in order to reduce sizes of stored and/or transmitted pictures. If the value filled in the unused area in each picture is removed, the processor 810 does not need to remove the value filled in the unused area in each picture when content is consumed.

According to an embodiment, the processor 810 may perform an operation according to an image processing procedure for content consumption as follows.

Upon receiving content data including compressed pictures, the processor 810 may perform decompression on the compressed pictures. The processor 810 may consider an encoding scheme used for compression to determine a decoding scheme for the decompression.

The processor 810 may remove a redundancy filled in an unused area in each of the decompressed pictures, and may output pictures that the redundancies are removed to the I/F 820.

The processor 810 may receive, from the content providing device, information about an unused area and/or a used area in each of the decompressed pictures via separate control information (meta data, etc.). The control information may be equally applied to one frame. That is, one control information may be provided for all pictures constituting one frame. If the content providing device removes a redundancy before transmitting content data, the processor 810 may omit an operation of removing the redundancy.

The transceiver 830 may transmit converted pictures that unused areas are replaced with a fill value under the control of the processor 810 based on one transmission scheme for a broadcast service.

The transceiver 830 may receive the converted pictures that the unused areas are replaced with the fill value under the control of the processor 810 based on the transmission scheme for the broadcast service, and transfer the converted pictures to the processor 810.

The memory 840 may store compressed content data under the control of the processor 810 and output stored content data under the control of the processor 810.

Figure 9:
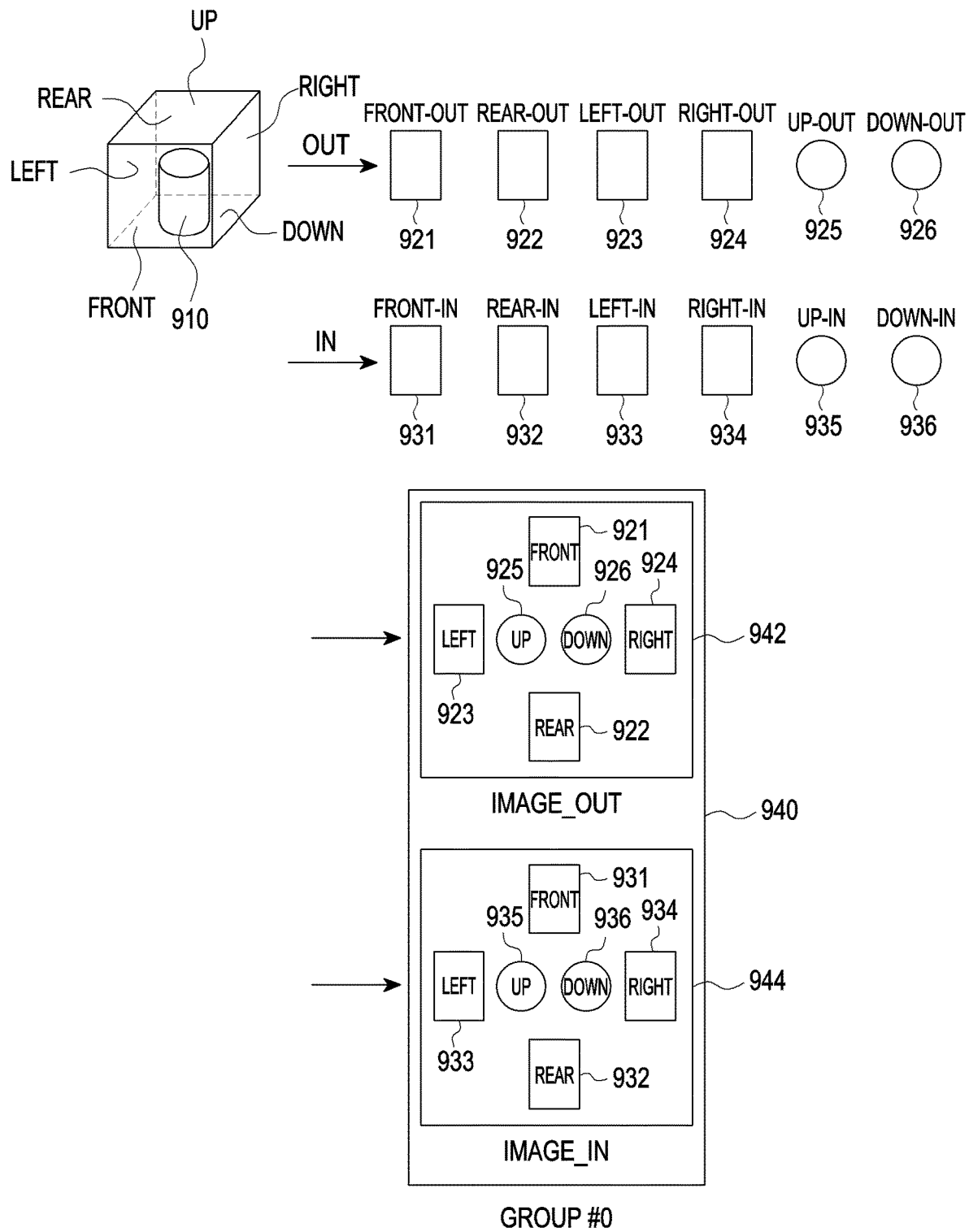
FIG. 9 is a diagram illustrating an example of image conversion in an electronic device according to various embodiments proposed in the present disclosure.

FIG. 9 is a diagram illustrating an example of image conversion in an electronic device according to various embodiments proposed in the present disclosure.

Referring to FIG. 9, one object 910 may be captured at each of a plurality of viewpoints (an external viewpoint and an internal viewpoint), and patches captured at each viewpoint may be output.

According to an embodiment, a target object 910 may be captured in front, rear, left, right, up, down directions at an external viewpoint, and external patches 921, 922, 923, 924, 925, and 926 which correspond to images captured in each direction may be generated. The target object 910 may be captured in front, rear, left, right, up, and down directions at an internal viewpoint, and internal patches 931, 932, 933, 934, 935, and 936 which correspond to the images captured in each direction may be generated.

The external patches 921, 922, 923, 924, 925, and 926 may be disposed in a first picture 942, and the internal patches 931, 932, 933, 934, 935, and 936 may be disposed in a second picture 944. The first picture 942 and the second picture 944 have the same time information, so the first picture 942 and the second picture 944 will be grouped into one group #0 940.

In the first picture 942, an area in which the external patches 921, 922, 923, 924, 925, and 926 are disposed corresponds to 'a used area in a first picture', and an area in which the external patches 921, 922, 923, 924, 925, and 926 are not disposed corresponds to 'a unused area in a first picture'.

In the second picture 944, an area in which the external patches 931, 932, 933, 934, 935, and 936 are disposed corresponds to 'a used area in a second picture', and an area in which the external patches 931, 932, 933, 934, 935, and 936 are not disposed corresponds to 'a unused area in a second picture'.

While the detailed description of the present disclosure has been described with reference to specific embodiments, it will be understood by those skilled in the art that various changes in form and details may be made therein without departing from the scope according to various embodiments proposed in the present disclosure. Therefore, the scope of the present disclosure should not be defined as being limited to the described embodiments, but should be defined by the appended claims and equivalents thereof. Further, these modified embodiments should not be individually understood from the technical spirit or perspective of the present disclosure.

The invention claimed is:

1. A method for processing an image, the method comprising:
    identifying a first unused area in a first picture and a second unused area in a second picture, the first picture and the second picture having the same time information;
    obtaining a fill value for replacing the first unused area and the second unused area based on a value obtained from the first unused area and a value obtained from the second unused area; and
    obtaining a first converted picture and a second converted picture by replacing the first unused area and the second unused area by using the obtained fill value.

2. The method of claim 1, wherein obtaining the fill value comprises:
    obtaining one of a value obtained from the first unused area in the first picture and a value obtained from the second unused area in the second picture as the fill value.

3. The method of claim 1, wherein obtaining the fill value comprises:
    obtaining an average value of a value obtained from the first unused area in the first picture and a value obtained from the second unused area in the second picture as the fill value.

4. The method of claim 1, wherein obtaining the fill value comprises:
    obtaining a minimum value of a value obtained from the first unused area in the first picture and a value obtained from the second unused area in the second picture as the fill value.

5. The method of claim 1, wherein obtaining the fill value comprises:
    obtaining a maximum value of a value obtained from the first unused area in the first picture and a value obtained from the second unused area in the second picture as the fill value.

6. The method of claim 1, further comprising:
    compressing, by using one encoding scheme, the first converted picture and the second converted picture that the first unused area and the second unused area are replaced with the obtained fill value.

7. The method of claim 1, further comprising:
    transmitting, based on one transmission scheme for a broadcast service, the first converted picture and the second converted picture that the first unused area and the second unused area are replaced with the obtained fill value.

8. The method of claim 1, wherein the first picture includes patches which are generated by capturing a target object at a first viewpoint, and the second picture includes patches which are generated by capturing the target object at a second viewpoint.

9. The method of claim 1, further comprising:
    grouping the first picture and the second picture among a plurality of pictures included in one frame into one group for image conversion.

10. The method of claim 1, further comprising:
    replacing a value of the first unused area in the first picture with a value obtained from a first used area in the first picture or a preset value; and
    replacing a value of the second unused area in the second picture with a value obtained from a second used area in the second picture or a preset value.

11. A device for processing an image, the device comprising:
    at least one memory; and
    at least one processor connected to the at least one memory,
    wherein the at least one processor is configured to:
        identify a first unused area in a first picture and a second unused area in a second picture, the first picture and the second picture having the same time information,
        obtain a fill value for replacing the first unused area and the second unused area based on a value obtained from the first unused area and a value obtained from the second unused area, and
        replace the first unused area and the second unused area by using the obtained fill value.

12. The device of claim 11, wherein the at least one processor is further configured to:
    obtain one of the value obtained from the first unused area and the value obtained from the second unused area as the fill value.

13. The device of claim 11, wherein the at least one processor is further configured to:
    obtain an average value of the value obtained from the first unused area and the value obtained from the second unused area as the fill value.

14. The device of claim 11, wherein the at least one processor is further configured to:
    obtain a minimum value of the value obtained from the first unused area and the value obtained from the second unused area as the fill value.

15. The device of claim 11, wherein the at least one processor is further configured to:
    obtain a maximum value of the value obtained from the first unused area and the value obtained from the second unused area as the fill value.

16. The device of claim 11, wherein the at least one processor is further configured to:
    compress, by using one encoding scheme, the first converted picture and the second converted picture that the first unused area and the second unused area are replaced with the obtained fill value, and write the compressed pictures to the memory.

17. The device of claim 11, further comprising:
    a transceiver configured to transmit, based on one transmission scheme for a broadcast service, the first converted picture and the second converted picture that the first unused area and the second unused area are replaced with the obtained fill value, under control of the at least one processor.

18. The device of claim 11, wherein the first picture includes patches which are generated by capturing a target object at a first viewpoint, and the second picture includes patches which are generated by capturing the target object at a second viewpoint.

19. The device of claim 11, wherein the at least one processor is further configured to:
    group the first picture and the second picture among a plurality of pictures included in one frame into one group for image conversion.

20. The device of claim 11, wherein the at least one processor is further configured to:
    replace a value of the first unused area in the first picture with a value obtained from a first used area in the first picture or a preset value, and
    replace a value of the second unused area in the second picture with a value obtained from a second used area in the second picture or a preset value.

* * * * *